Oct. 23, 1962
T. H. KERRY ET AL
3,059,878
AUXILIARY AIR INTAKES FOR JET ENGINES
ADAPTED FOR VERTICAL TAKE-OFF
Filed Sept. 21, 1959
4 Sheets-Sheet 1
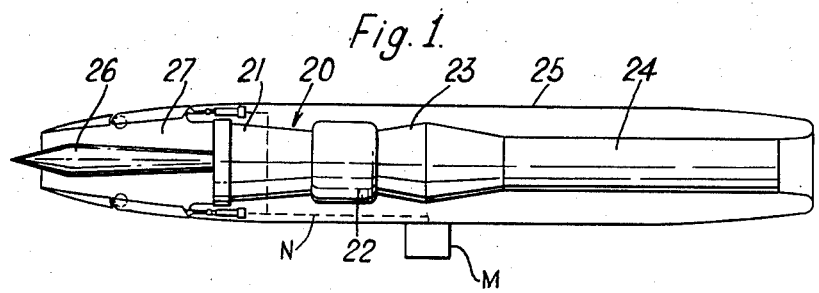
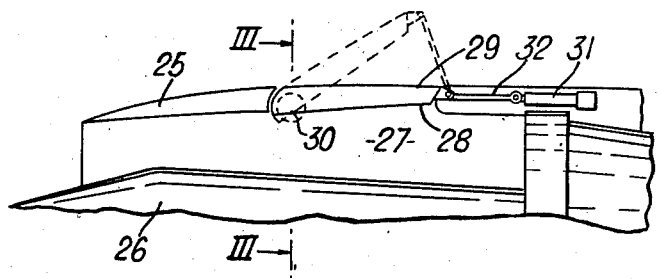
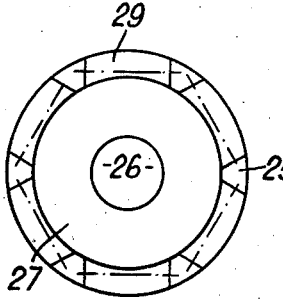
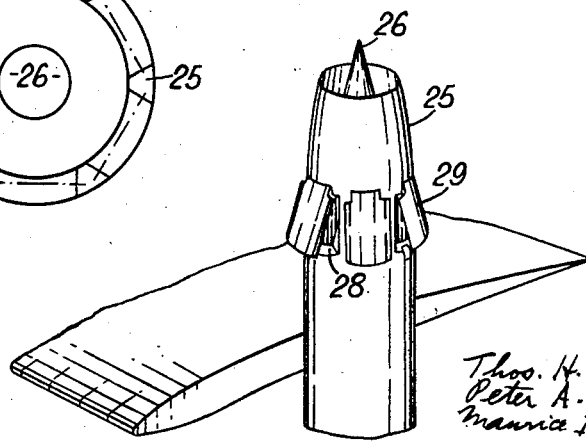
Thos. H. Kerry
Peter A. Ward
Maurice J. Taylor
*Attorney*

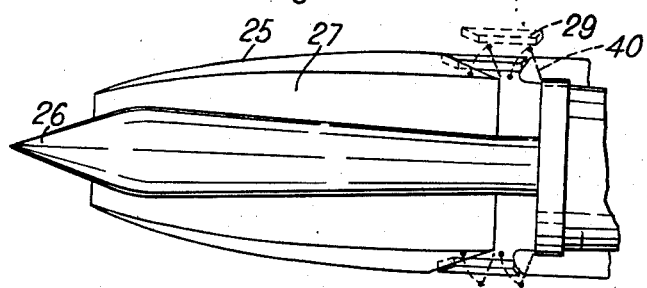
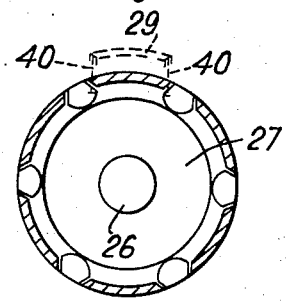
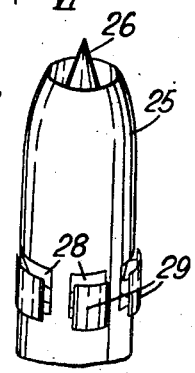
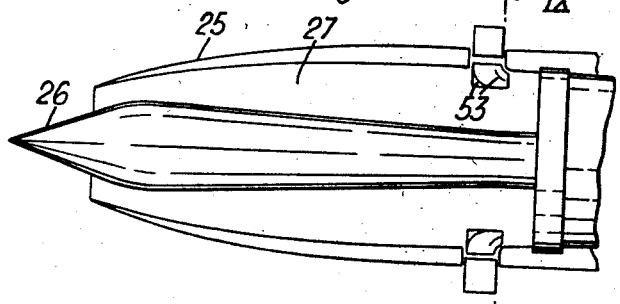

Oct. 23, 1962  T. H. KERRY ET AL  3,059,878
AUXILIARY AIR INTAKES FOR JET ENGINES
ADAPTED FOR VERTICAL TAKE-OFF
Filed Sept. 21, 1959  4 Sheets-Sheet 3

Oct. 23, 1962 T. H. KERRY ET AL 3,059,878
AUXILIARY AIR INTAKES FOR JET ENGINES
ADAPTED FOR VERTICAL TAKE-OFF
Filed Sept. 21, 1959 4 Sheets-Sheet 4

United States Patent Office 3,059,878
Patented Oct. 23, 1962

3,059,878
AUXILIARY AIR INTAKES FOR JET ENGINES ADAPTED FOR VERTICAL TAKE-OFF
Thomas Henry Kerry, Derby, Peter Arthur Ward, Littleover, Derby, and Maurice Ian Taylor, Allestree, England, assignors to Rolls-Royce Limited, Derby, England, a company of Great Britain
Filed Sept. 21, 1959, Ser. No. 841,182
Claims priority, application Great Britain Nov. 26, 1958
5 Claims. (Cl. 244—23)

This invention relates to gas turbine engines.

According to the present invention, there is provided a gas turbine engine having mounting means to permit rotation of the engine at right angles to its longitudinal axis, whereby the engine can be employed to provide thrust for forward flight or alternatively to provide thrust in a vertical direction, the engine comprising an air intake casing having at least one peripherally extending air inlet port formed therein, there being at least one closure member for each said port, a mechanism being provided for moving each closure member relative to the casing so as to open and close the respective port.

Thus the engine air intake casing may be provided with a series of peripherally extending angularly spaced apart air intake ports arranged parallel with, or at a small angle to, the longitudinal axis of the engine, the ports being opened and closed by the closure members.

The air intake ports are preferably provided in a nacelle surrounding the engine, the closure members when in the closed position being adapted to form a substantially smooth continuation of the outer and/or inner skin of the nacelle.

Each closure member may comprise a pivotally mounted flap member. Each closure member may also be so mounted that, when it is in the open position, it is lifted bodily away from the said casing.

If desired, each port may be opened and closed by a pair of radially spaced apart closure members which are respectively adapted to form a substantially smooth continuation of the inner and outer skins of the said casing.

The invention also comprises an aircraft provided with a gas turbine engine as set forth above, means being provided for rotating the engine between an horizontal and a vertical position.

Preferably the said rotating means is so interconnected with the said mechanism for moving the closure members that, during movement between the said horizontal and vertical positions, opening is effected of only those closure members which face in a forward direction relative to the direction of flight, any remaining closure members being opened when the engine has attained the vertical position.

In order that the invention can be clearly understood, and readily carried into effect, four alternative forms of the invention, will now be particularly described, by way of example only, with reference to the accompanying drawings in which:

FIGURE 1 is a part sectional elevation showing the air intake of a gas turbine engine which is mounted within a nacelle and provided with auxiliary air intake means in accordance with the invention.

FIGURE 2 is an enlarged sectional view of the air intakes shown in FIGURE 1.

FIGURE 3 is a sectional view on line III—III in FIGURE 2.

FIGURE 4 is a perspective view of the arrangement shown in FIGURE 1.

FIGURE 5 shows an alernative form of the invention.

FIGURE 6 is a sectional view on line VI—VI in FIGURE 5.

FIGURE 7 is a perspective view of the arrangement shown in FIGURE 5.

FIGURE 8 shows a further alternative form of the invention.

In the drawings and description parts which are identical in each of the illustrated constructions are indicated by the same reference numerals.

Figure 9:
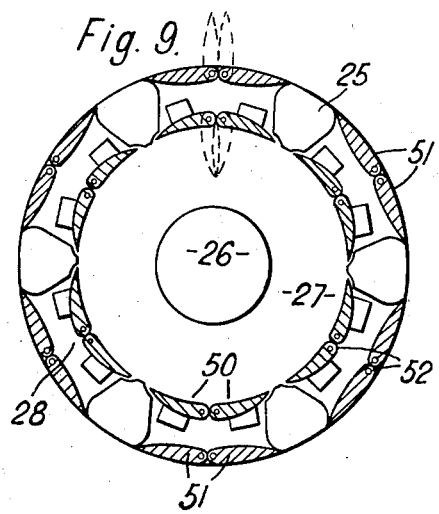
FIGURE 9 is a view on line IX—IX in FIGURE 8.

Referring first of all to FIGURES 1, 2, 3 and 4 of the drawings, 20 indicates a gas turbine jet propulsion engine, having a compressor 21, combustion equipment 22, a turbine 23 which is drivingly connected to the compressor 21, and an exhaust nozzle 24.

The engine 20 is housed within a nacelle 25, the forward or upstream end of which defines, in combination with a nose cone 26, an annular air inlet passage 27 which communicates with the compressor inlet casing.

It has been found that, when that portion of the nacelle forming the outer periphery of the inlet end of the passage 27 is formed as shown in the drawings, then during ground idling conditions of the engine or during low speed flight, there is set up a vortex or swirling of the air entering the passage 27. This vortex or swirling occurs in the passage 27 slightly downstream of the inlet and is caused by the main inlet being "sharp lipped" so as to be suitable for supersonic flight, whereby a restriction is formed and the quantity of air entering the passage 27 from atmosphere is reduced below the quantity required for efficient functioning of the engine. It will be seen therefore that the engine efficiency will be reduced.

Such a deficiency can be overcome by providing the inlet to the passage 27 with an outwardly flared mouth whereby the previously mentioned vortex or turbulence is obviated. However, such an arrangement suffers from the disadvantage that it produces a drag effect during flight.

In accordance with the invention nacelle 25 is therefore provided with a series of angularly spaced apart, peripherally extending rectangular ports 28 which provide for the supply of additional air to the passage 27.

Each port 28 can be selectively opened or closed by means of a flap member 29. The flap member 29 is mounted for pivotal movements, about its upstream end, on a pivot member 30 disposed at right angles to the longitudinal axis of the engine 20, each flap member 29 being adapted to be operated by means of a screw jack 31 to which it is connected by a link 32.

It will be appreciated that whilst in this particular construction the flap members 29 are actuated by screw jacks, they can in fact be moved in any other convenient manner, for example by hydraulic or pneumatic rams.

When an engine incorporating the invention is in use, then during ground idling or low speed flight conditions the flap members 29 are caused to turn about their pivots 30 and move into the position shown in FIGURE 4 of the drawings. In this position of the flap members 29, the ports 28 are open to admit air into the passage 27, to compensate for the lack of air caused by the vortex at the inlet to the passage 27.

In the particular construction shown in the drawings the engine is mounted for rotation at right angles to its longitudinal axis, whereby its longitudinal axis can be disposed either vertically or horizontally in order to provide for either vertical or forward thrust. A mechanism M is provided for effecting such rotation.

In such an arrangment the screw jacks 3 may be interconnected by connecting means indicated diagrammatically at N with the mechanism M for causing rotation of the engine at right angles to its logintudinal axis, in such a manner that as the engine is caused to move from a horizontal position to a vertical position, only those flaps 29 which face in a forward direction relative to the movement of the engine through the atmosphere are caused to open their associated ports 28 during the transition from one position to another.

Once the engine has attained the vertical position the rotating mechanism M is adapted to cause opening of all the ports 28.

In the construction shown in FIGURES 5, 6 and 7 of the drawings, instead of mounting the flap members 29 for pivotal movements about their upstream ends only, each flap member is supported on four links 40 each of which is mounted for pivotal movements at right angles to the longitudinal axis of the engine whereby the flaps are lifted bodily away from the nacelle.

The links 40 are turned about their pivots, as in the previous construction, by means of screw jacks or the like, not shown, so as to either open or close the ports 28.

Similarly, as in the previous construction, when the engine is mounted for rotation at right angles to its longitudinal axis and is being moved from a horizontal position to a vertical position only those flap members which will face forwardly of the engine in the vertical position are opened during the transition from the horizontal to the vertical position, the remaining flaps being opened once the engine has attained the vertical position.

Figure 10:
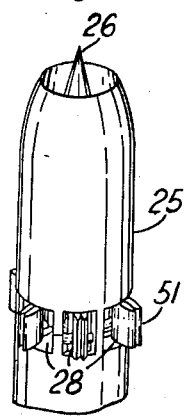
FIGURE 10 is a perspective view of the arrangement shown in FIGURE 8.

In the further alternative construction shown in FIGURES 8, 9 and 10 of the drawings, each port 28 is selectively opened and closed by two pairs of radially spaced apart flaps 50 and 51. The flaps 50 are adapted to seal off the radially inner portion of the port 28 and form a substantially smooth continuation of the inner skin of the nacelle, whilst the flaps 51 are adapted to seal off the radially outer portion of the port 28 and form a substantially smooth continuation of the outer skin of the nacelle.

Each flap member of each pair of flap members 50 and 51 is pivotally mounted on a pivot member 52 which has its longitudinal axis arranged parallel with the longitudinal axis of the engine, and the flap members of each pair are adapted, when turned about their associated pivot member, to rotate in opposite directions.

The flap members 50 and 51 can be opened, as in the previous construction, during ground idling or low speed flight conditions. To increase the supply of air to the compressor, and to assist in directing atmospheric air into the passage 27, guide vanes 53 are mounted on the radially inner face of the nacelle 25 adjacent the ports.

Furthermore, as in the previously described constructions, when the engine is mounted so as to be rotatable between a horizontal and vertical position, those flap members sealing the ports which will face forwardly of the engine when it is in the vertical position are arranged to be progressively opened during the transition of the engine from the horizontal to the vertical position. This is effected by suitably interconnecting the mechanism for actuating the flaps and the mechanism for causing rotation of the engine. As before, once the engine has attained the vertical position all the flaps will be opened, to admit air to the passage.

Figure 11:
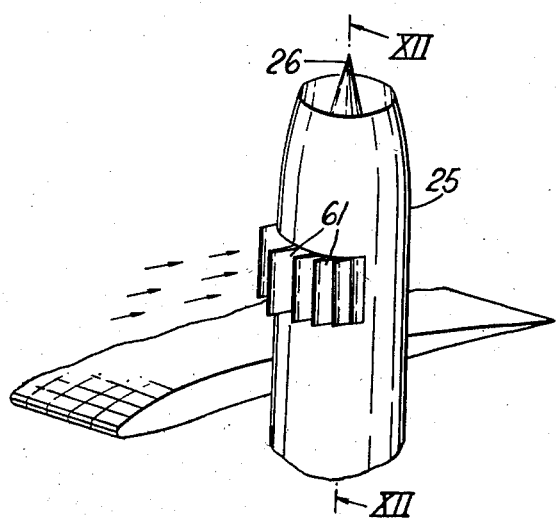
FIGURE 11 is a perspective view showing a still further alternative form of the invention.
Figure 12:
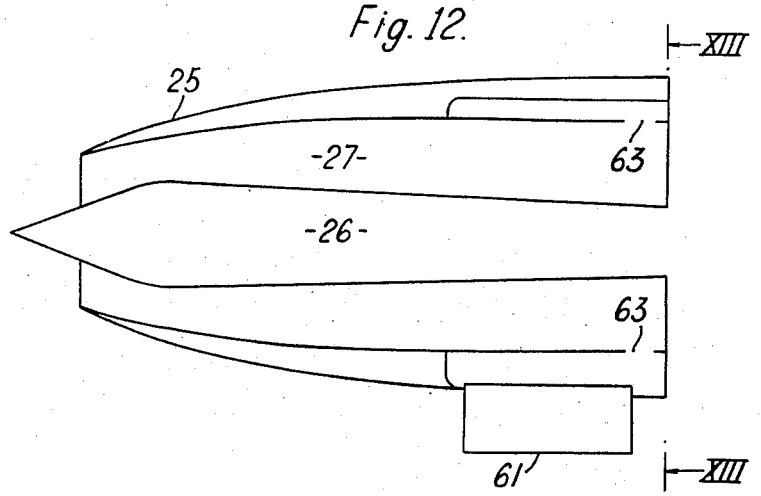
FIGURE 12 is a sectional view on line XII—XII in FIGURE 11 of the drawings.
Figure 13:
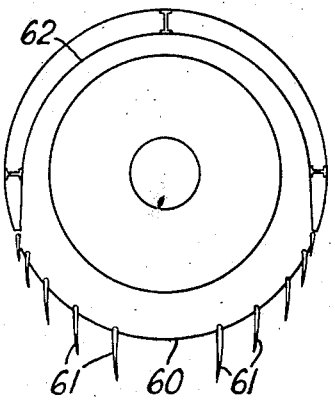
FIGURE 13 is a sectional view on the line XIII—XIII in FIGURE 12 of the drawings.

Referring now to FIGURES 11, 12 and 13 of the accompanying drawings, instead of employing a series of peripherally extending, angularly spaced apart ports as in the previous construction, a single peripherally elongated port 60 is formed in that portion of the nacelle which is disposed on the underside of the engine, when the engine is in the horizontal position. The port 60 is adapted to be selectively opened and closed by means of a series of flap members 61 each of which is mounted on a pivot member disposed transversely across the port 60, the flap members 61 being arranged, when moved to close the port 60, to form a substantially smooth continuation of the outer skin of the nacelle.

When the flap members 61 are moved to open the port 60, adjacent flaps define between them individual ports 28 through which air can flow to the passage 27.

The port 60 communicates with a manifold 62 formed in the nacelle 25. The manifold 62 has an outlet 63 which communicates with the passage 27 whereby the additional air can be supplied to the intake around its whole periphery.

As in the previous constructions, where the engine is mounted for rotational movements at right angles to its longitudinal axis, the mechanism for actuating the flap members, which may be a screw jack, pneumatic ram or the like, is interconnected with the mechanism for rotating the engine whereby when the engine is moved to a vertical position the flaps are simultaneously moved to open the port 60.

It will be seen therefore that the invention provides an arrangement whereby an engine employing a high speed intake can be adapted to operate efficiently at low speeds.

In a still further arrangement, not shown in the drawings, each flap member is supported on hinges disposed adjacent the longitudinal edges of the respective ports, and is so shaped that when the flap members are moved to open the ports they form scoops which assist in directing air into the ports.

We claim:

1. A gas turbine engine having means mounting the engine for rotation at right angles to its longitudinal axis, whereby the engine can be employed in an aircraft to provide thrust selectively for forward flight and in a vertical direction, said engine having an air intake casing having a series of angularly spaced apart, peripherally extending ports therein which are arranged substantially parallel with the longitudinal axis of the engine, at least one closure member for each said port, and a separate mechanism for moving each closure member individually relative to the casing so as to open and close the respective port, and means arranged to control said separate mechanisms so that selected ports in the intake casing can be opened while others are closed.

2. A gas turbine engine comprising an air intake casing having at least one peripherally extending air intake port formed therein, at least one closure member for said port, a mechanism for moving the closure member bodily outwardly away from the casing so as to open and close the port, drive means for rotating the engine between an horizontal and a vertical position, and connecting means connecting said drive means and said mechanism, said connecting means causing opening movement of said closure member on movement of the engine towards the vertical position.

3. A gas turbine engine comprising an air intake casing having an inner and an outer skin, at least one peripherally extending air intake port formed in each skin, at least one pair of radially spaced apart closure members for the port in each skin, said closure members being respectively adapted to form a substantially smooth continuation of the inner and outer skins of the said casing, a mechanism for moving the outer pair of closure members outwardly relative to the outer skin and the inner pair inwardly so as to open and close the ports, drive means for rotating the engine between an horizontal and a vertical position, and connecting means connecting said drive means and said mechanism, said connecting means causing opening movement of said closure members on movement of the engine towards the vertical position.

4. For use in an aircraft adapted for vertical take-off, a gas turbine engine comprising an air intake casing having a peripherally elongated air intake port formed in that portion of the said casing which is disposed on the underside of the engine when the latter is in the horizontal position, at least one closure member for said port, a mechanism for moving the closure member relative to the casing so as to open and close the port, means for rotating the engine between an horizontal and a vertical position, and connecting means connecting said drive meas and said mechanism, said connecting means causing opening movement of said closure member on movement of the engine towards the vertical position.

5. A gas turbine engine comprising an air intake casing having at least one peripherally extending air intake port formed therein, at least one closure member for said port, a mechanism for moving the closure member relative to the casing so as to open and close the port, means for rotating the engine between an horizontal and a vertical position, and connecting means connecting said drive means and said mechanism, said connecting means causing opening movement of said closure member on movement of the engine towards the vertical position.

References Cited in the file of this patent

UNITED STATES PATENTS

| | | |
|---|---|---|
| 2,604,278 | Johnson | July 22, 1952 |
| 2,699,906 | Lee et al. | Jan. 18, 1955 |
| 2,762,584 | Price | Sept. 11, 1956 |
| 2,780,424 | Price | Feb. 5, 1957 |
| 2,788,184 | Michael | Apr. 9, 1957 |
| 2,960,281 | Jumelle | Nov. 15, 1960 |

FOREIGN PATENTS

| | | |
|---|---|---|
| 1,201,570 | France | July 15, 1959 |